United States Patent [19]

Brackett et al.

[11] Patent Number: 5,377,629
[45] Date of Patent: Jan. 3, 1995

[54] ADAPTIVE MANIFOLD TUNING

[75] Inventors: Stephen E. Brackett, Blenheim; Dennis E. Houle, Chatham, both of Canada

[73] Assignee: Siemens Electric Limited, Chatham, Canada

[21] Appl. No.: 139,370

[22] Filed: Oct. 20, 1993

[51] Int. Cl.6 .................................... F02B 75/18
[52] U.S. Cl. ............................. 123/184.56; 181/229
[58] Field of Search .................. 123/52 M, 52 MB; 181/229

[56] References Cited

U.S. PATENT DOCUMENTS 4,546,733 10/1985 Fukami et al. .................... 181/229
5,040,495 8/1991 Harada et al. ................. 123/52 MB

FOREIGN PATENT DOCUMENTS 215925  8/1990 Japan ............................ 123/52 MB
107522  5/1991 Japan ............................. 123/52 M
2031999 4/1980 United Kingdom .......... 123/52 MB

*Primary Examiner*—Noah P. Kamen
*Attorney, Agent, or Firm*—George L. Boller; Russel C. Wells

[57] ABSTRACT

The effective area of a Helmholtz resonator used to tune the manifold is varied in accordance with engine speed to improve the engine-torque speed curve. The organization and arrangement of air intake passage, plenum chamber, runners, and Helmholtz resonator is also advantageous.

9 Claims, 3 Drawing Sheets

■ BASE    + 1ST OPTION    ✶ 2ND OPTION

# ADAPTIVE MANIFOLD TUNING

FIELD OF THE INVENTION

This invention relates to induction systems for internal combustion engines, and it is particularly concerned with tuning of engine manifolds by means of resonators.

BACKGROUND AND SUMMARY OF THE INVENTION

It is well known to employ resonators to tune the manifolds of internal combustion engines, especially engines that are used for powering automotive vehicles. Commonly assigned U.S. Pat. No. 5,162,621 discloses the use of a Helmholtz resonator to tune the manifold of an engine.

Typical intake manifold geometries provide an engine torque-speed characteristic that has a peak torque at a certain engine speed. Over a range of engine speeds beyond that certain engine speed, the torque dips. The present invention is directed toward reducing, or even eliminating, such a dip.

In one respect, the present invention relates to a new and improved Helmholtz resonator that can provide adaptive manifold tuning for the purpose of improving engine performance. More specifically, this aspect of the invention relates to endowing the neck of a Helmholtz resonator with means for selectively setting the effective transverse cross sectional area of communication that the neck provides between the Helmholtz resonator chamber and the air intake passage of the engine induction system. The selective setting is accomplished by an obturator, or valve, that is selectively positioned by an actuator to selectively restrict the neck opening. The actuator is under the control of one or more engine operating parameters, such as engine speed.

While the adaptive tuning is accomplished in an advantageous fashion by the organization and arrangement of air intake passage, plenum chamber, runners, and Helmholtz resonator, insofar as the applicants are aware, such organization and arrangement possesses novelty independently of the feature of selectively restricting the neck of the Helmholtz resonator, and such organization and arrangement constitutes a further aspect of the invention.

The foregoing, along with further features, advantages, and benefits of the invention, will be seen in the ensuing description and claims which are accompanied by drawings depicting a presently preferred embodiment of the invention according to the best mode contemplated at this time for carrying out the invention.

DESCRIPTION OF THE PREFERRED EMBODIMENT

Figure 1:
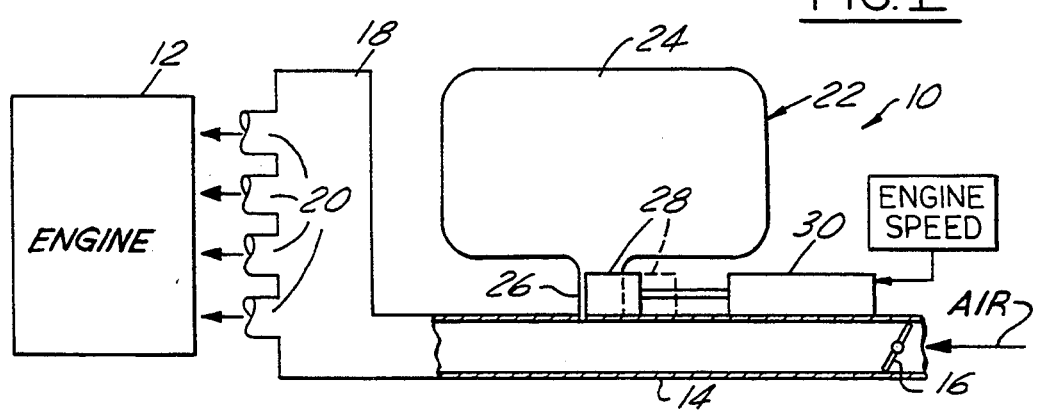
FIG. 1 is a somewhat schematic diagram of an internal combustion engine induction system which includes the adaptive manifold tuning of the present invention.

A representative induction system 10 for an internal combustion engine 12 is shown in FIG. 1. Induction system 10 comprises an induction air intake passage 14 that contains a butterfly-valve type throttle 16 for selectively throttling induction air flow. Intake passage 14 leads to a plenum chamber 18, and from plenum chamber 18 there are a number of runners 20 for delivering induction air to individual combustion chambers of engine 12.

The adaptive manifold tuning of the present invention comprises a Helmholtz resonator 22 associated with induction system 10. Helmholtz resonator 22 comprises a resonator chamber 24 that is placed in communication with intake passage 14 at a location that is downstream of throttle 16 but upstream of plenum chamber 18. Communication is established by means of a neck 26 of Helmholtz resonator 22. The invention relates to means for selectively setting the effective transverse cross-sectional area of communication that neck 26 provides between chamber 24 and intake passage 14. This means comprises an obturator, or valve, 28 that is operated by an actuator 30, which is itself operated in accordance with one or more parameters representative of the operation of engine 12. In the preferred embodiment, actuator 30 is controlled as a function only of speed of engine 12, but it is possible that other control strategies may involve one or more other parameters with or without engine speed. Engine speed information may be derived from any conventional source of engine speed that may be available.

By selectively setting the effective transverse cross-sectional area of communication that neck 26 provides between chamber 24 and intake passage 14, it is possible for a given engine to develop a noticeable increase in torque output over that which might otherwise be obtained in the absence of adaptive manifold tuning. Since the Helmholtz principle is a function of not only the effective transverse cross-sectional area of communication provided by neck 26, but also of the length of the neck and the volume of resonator chamber 24, the torque improvement that can be obtained in any given engine is a function of three parameters. In the present embodiment, the volume of resonator chamber 24 is fixed, as is the length of neck 26, but it is contemplated that more elaborate tuning systems could have means to vary these parameters as well as the effective transverse cross-sectional area of communication provided by neck 26.

Figure 2:
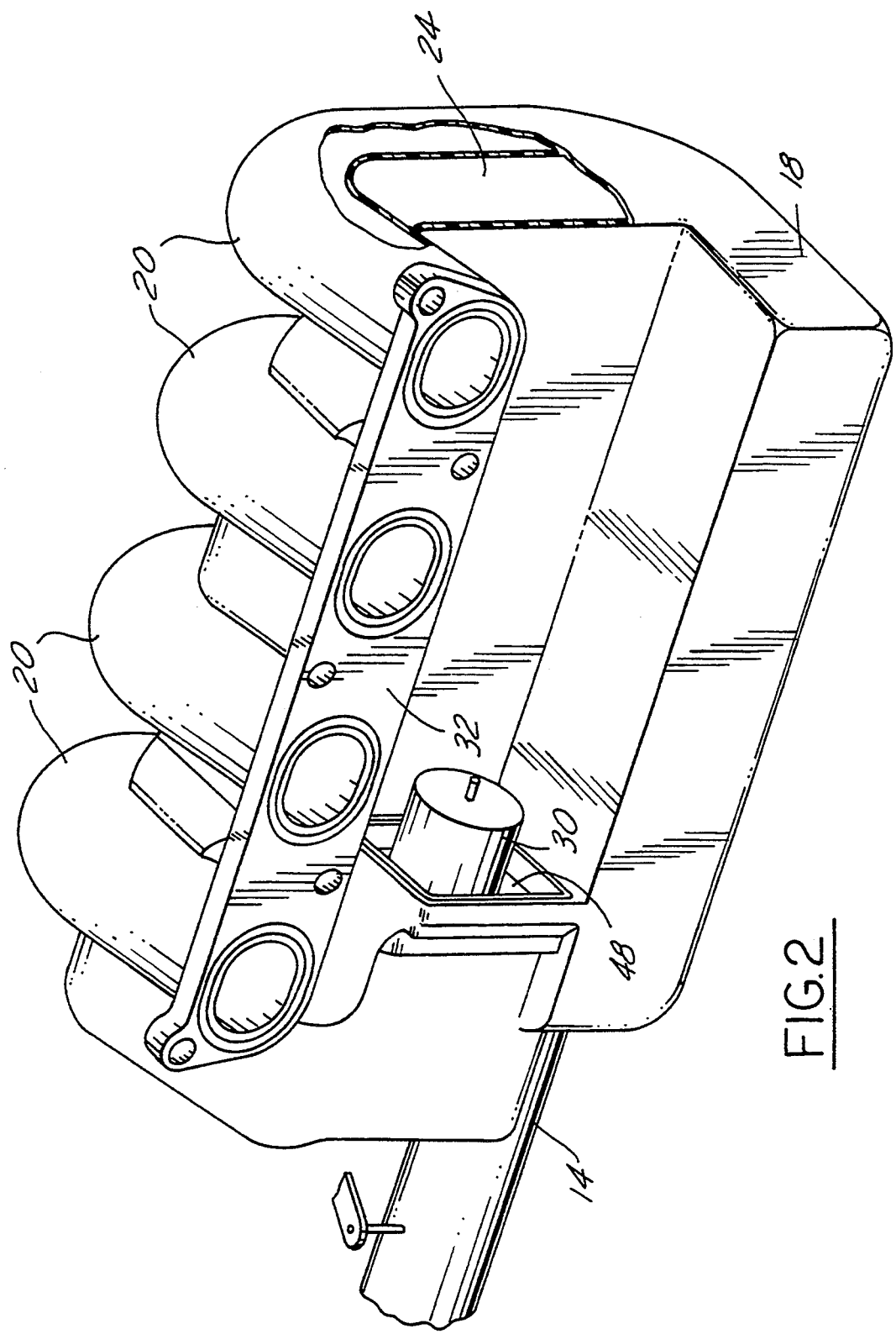
FIG. 2 is a perspective view of an induction system having the adaptive manifold tuning.
Figure 3:
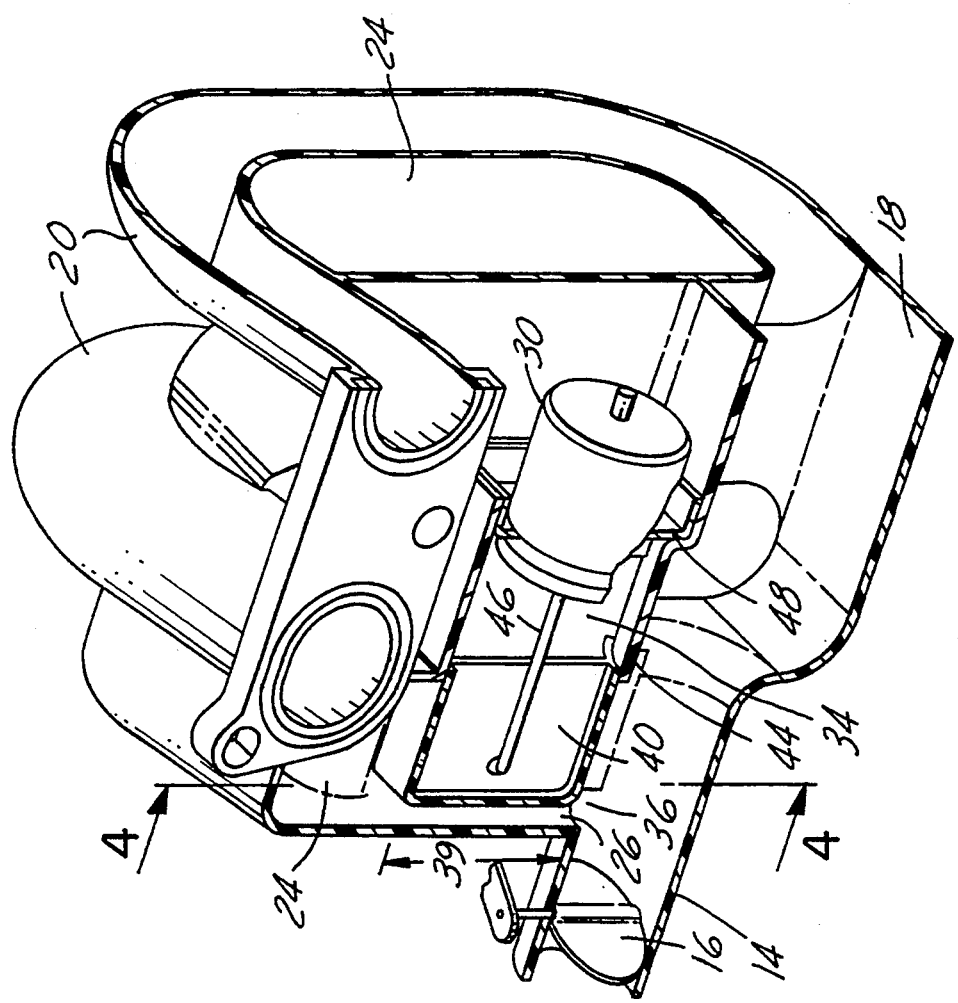
FIG. 3 is a fragmentary view of a portion of FIG. 2 with certain portions having been sectioned away to illustrate internal features.
Figure 4:
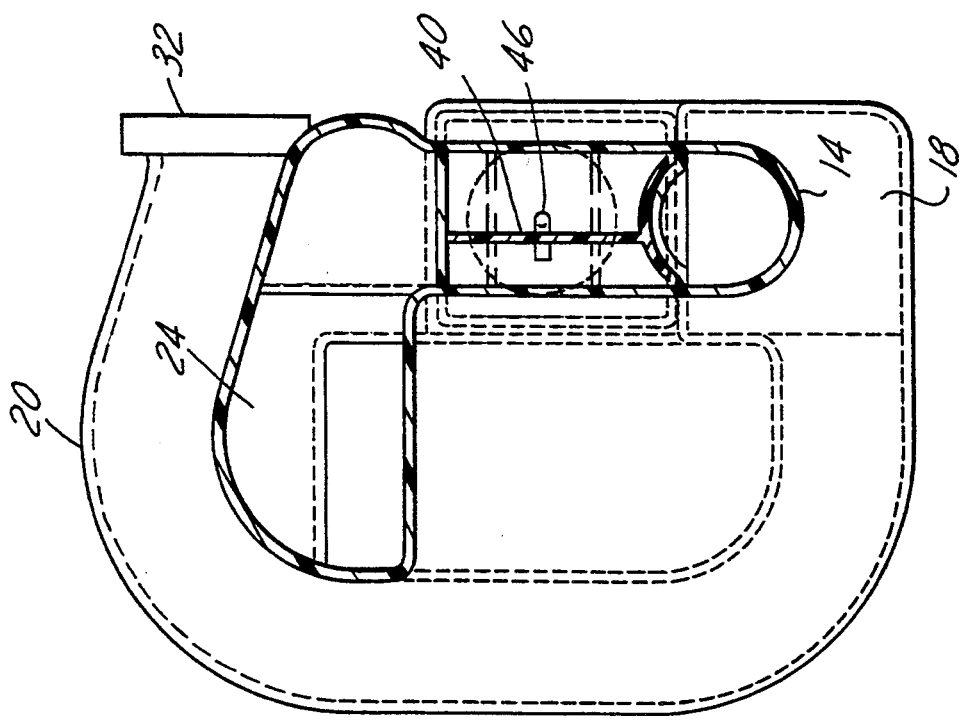
FIG. 4 is a transverse view as taken in the direction of arrows 4—4 in FIG. 3.

FIGS. 2–4 depict constructional detail for the schematic system described in FIG. 1. Like reference numerals designate like parts in FIG. 1–4. Intake passage 14 is shown in FIGS. 2–4 as a circular walled tube that merges axially into one end of plenum chamber 18. Plenum chamber 18 and resonator chamber 24 are arranged generally side-by-side; however, resonator chamber 24 axially overlaps both intake passage 14 and plenum chamber 18 such that a portion of intake passage 14 immediately adjoining plenum chamber 18 is juxtaposed generally side-by-side with the portion of resonator chamber 24 that overlaps it, while the remaining portion of resonator chamber 24 is juxtaposed side-by-side with plenum chamber 18.

Runners 20 extend from a side of plenum chamber 18 to wrap partially around a side of resonator chamber 24. The runners terminate in a mounting flange 32 that attaches to engine 12. Flange 32 and an immediately joining short segment of each runner overhang from resonator chamber 24 so as to overlie both plenum chamber 18 and air intake passage 14, as perhaps best seen in FIG. 4.

Obturator 28 is a slide that is contained within a compartment 34 that forms neck 26. The location where the neck opens to intake passage 14 is designated 36 while the location where the neck opens to resonator chamber 24 is designated 38. The height of the neck is designated 39. The obturator selectively obturates the neck opening in accordance with the extent that it is slid in a plane that is transverse to the length of the neck. Compartment 34 is large enough to contain obturator 28 and to accommodate the range over which it can slide. Obturator 28 comprises a flat planar body 40 of generally rectangular shape that is bounded on three sides by a flange 42. The flange provides guidance for the sliding motion of the obturator within the compartment. Where it confronts intake passage 14 and plenum chamber 18, flange 42 is curved to match the curvature of the exterior of a portion of a wall 44 that extents from opening 36 in the direction of the plenum chamber to form portions of the wall of intake passage 14 and plenum chamber 18 where the two merge. With this arrangement, obturator 28 can be selectively extended and retracted in a direction parallel to the transverse cross-sectional area of communication that is provided by neck 26 to thereby set the effective transverse cross-sectional area of communication that the neck provides between resonator chamber 24 and intake passage 14.

Positioning of obturator 28 is accomplished by a rod 46 of actuator 30. For example, actuator 30 may be a vacuum operated servo-type actuator as perhaps best seen in FIG. 3. Actuator 30 is mounted in a wall member 48 that forms a closure for that end of compartment 34.

Figure 5:
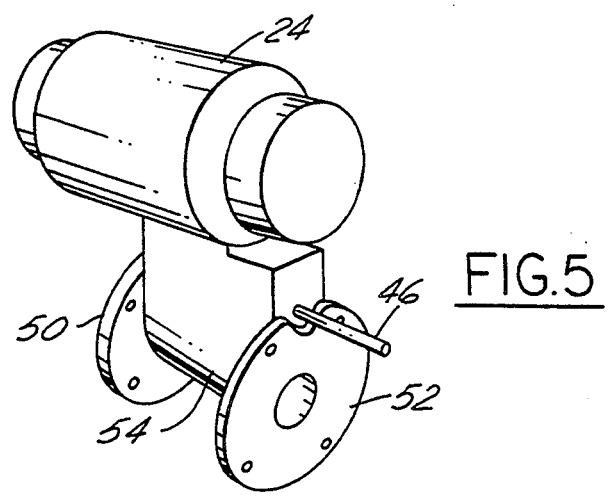
FIG. 5 is a perspective view of another embodiment.

By using a fabricating technology, such as lost core fabrication, intake passage 14, plenum chamber 18, runners 20, and Helmholtz resonator 22 may be fabricated as a unitary part. Obturator 28 and actuator 30 are assembled into the unitary part.

Where an induction system does not comprise such unitary construction, the Helmholtz resonator with adaptive tuning feature of the invention may be embodied in a separate assembly that can be in-line mounted in the air intake passage. An example of such an assembly is shown in FIG. 5. It comprises flanges 50, 52 providing for the in-line mounting of the assembly in the air intake passage, and a body 54 that is between these flanges and houses the obturator, while forming the neck of the Helmholtz resonator leading to the resonator chamber. The actuator rod 46 extends through body 54 to the actuator, which is not shown, but is external to the body. While it is preferred that the Helmholtz resonator have communication with the induction system downstream of the throttle, it is possible that such communication may take place upstream of the throttle. An advantage of having the resonator communicate with the induction system downstream of the throttle is that at part throttle conditions, the torque curve is significantly improved with lower loss in wide open throttle torque.

Figure 6:
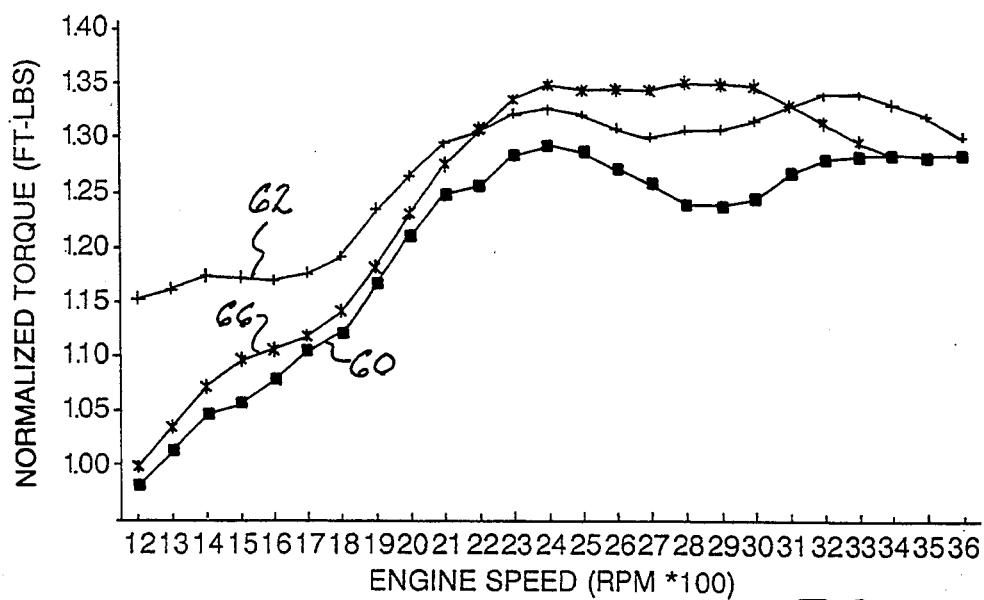
FIG. 6 is a graph that illustrates representative improvement that can be obtained with the adaptive manifold tuning of the invention.

FIG. 6 graphs engine output torque in non-dimensional units versus engine speed. A first graph plot 60 is a baseline for a particular engine without the adaptive manifold tuning feature of the invention. A second graph plot 62 is for the same engine but with the adaptive tuning feature and with a particular size Helmholtz resonator chamber. A third graph plot 66 is for the same engine also with adaptive tuning feature but with a different size Helmholtz resonator chamber. It can be seen that definite torque improvements can be obtained with the invention. Obviously, the nature and extent of improvement will depend on a number of factors, and in any given application of the invention, it may be necessary to vary different factors to get the best improvement that is obtainable.

While a presently preferred embodiment of the invention has been illustrated and described, it should be appreciated that principles are applicable to other embodiments.

What is claimed is:

1. An internal combustion engine induction system comprising an induction air intake passage containing throttle valve means for selectively throttling induction air flow, plenum chamber means for receiving the induction air flow that has passed through said induction air intake passage, runners leading from said plenum chamber means for delivering induction air to individual combustion chambers of an engine, and a Helmholtz resonator chamber that is placed in communication with said induction air intake passage by means of a neck of the Helmholtz resonator, characterized by means for selectively setting the effective transverse cross sectional area of communication that said neck provides between said resonator chamber and said induction air intake passage, said means for selectively setting the effective transverse cross sectional area of communication that said neck provides between said resonator chamber and said induction air intake passage comprising obturator means that is operated by an actuator means in accordance with an engine operating parameter, said obturator means comprising a slide that is selectively positionable in the plane of said transverse cross sectional area by said actuator means, and characterized further in that said slide is guided, at least in part, on the exterior of a wall portion of at least one of said induction air intake passage and said plenum chamber.

2. An internal combustion engine induction system as set forth in claim 1 characterized further in that said engine operating parameter is engine speed.

3. An internal combustion engine induction system comprising an induction air intake passage containing throttle valve means for selectively throttling induction air flow, plenum chamber means for receiving the induction air flow that has passed through said induction air intake passage, runners leading from said plenum chamber means for delivering induction air to individual combustion chambers of an engine, and a Helmholtz resonator comprising a resonator chamber that is placed in communication with said induction air intake passage by means of a neck of the Helmholtz resonator, characterized by means for selectively setting the effective transverse cross sectional area of communication that said neck provides between said resonator chamber and said induction air intake passage, and characterized further in that said neck places said resonator chamber in communication with said induction air intake passage at a location along said induction air intake passage that is downstream of said throttle valve means.

4. An internal combustion engine induction system as set forth in claim 3 characterized further in that one portion of said resonator chamber and one portion of said plenum chamber means share one common wall portion and other portions of said resonator chamber and portions of said runners share respective other common wall portions.

5. An internal combustion engine induction system comprising an induction air intake passage containing throttle valve means for selectively throttling induction air flow, plenum chamber means for receiving the induction air flow that has passed through said induction air intake passage, runners leading from said plenum chamber means for delivering induction air to individual combustion chambers of an engine, and a Helmholtz resonator comprising a resonator chamber that is placed in communication with said induction air intake passage by means of a neck of the Helmholtz resonator, characterized by means for selectively setting the effective transverse cross sectional area of communication that said neck provides between said resonator chamber and said induction air intake passage, and characterized further in that said plenum chamber means and said resonator chamber are juxtaposed generally side-by-side with said runners extending from a side of said plenum chamber means to wrap partially around a side of said resonator chamber.

6. An internal combustion engine induction system as set forth in claim 5 characterized further in that said runners overhang beyond said resonator chamber after said runners have wrapped partially around a side of said resonator chamber, and at least a portion of said means for selectively setting the effective transverse cross sectional area of communication that said neck provides between said resonator chamber and said induction air intake passage lies between at least one of said extensions and said induction air intake passage.

7. An internal combustion engine induction system comprising an induction air intake passage containing throttle valve means for selectively throttling induction air flow, plenum chamber means for receiving the induction air flow that has passed through said induction air intake passage, runners leading from said plenum chamber means for delivering induction air to individual combustion chambers of an engine, and a Helmholtz resonator comprising a resonator chamber that is placed in communication with said induction air intake passage by means of a neck of the Helmholtz resonator, characterized in that a portion of said plenum chamber means and a portion of said resonator chamber are juxtaposed generally side-by-side with said runners extending from said portion of said plenum chamber means to wrap partially around said portion of said resonator chamber.

8. An internal combustion engine induction system as set forth in claim 7 characterized further in that a portion of said induction air intake passage immediately adjoining said portion of said plenum chamber means is juxtaposed generally side-by-side with another portion of said resonator chamber that immediately adjoins said one portion of said resonator chamber, and said neck is disposed between said another portion of said resonator chamber and said portion of said induction air intake passage.

9. An internal combustion engine induction system as set forth in claim 8 characterized further by means for selectively setting the effective transverse cross sectional area of communication that said neck provides between said resonator chamber and said induction air intake passage.

* * * * *